United States Patent [19]
Edahiro et al.

[11] 4,318,726
[45] Mar. 9, 1982

[54] PROCESS FOR PRODUCING OPTICAL FIBER PREFORM

[75] Inventors: Takao Edahiro, Mito; Gotaro Tanaka, Yokohama; Toru Kuwahara, Yokohama; Michihisa Kyoto, Yokohama, all of Japan

[73] Assignees: Nippon Telegraph & Telephone Public Corp., Tokyo; Sumitomo Electric Industries, Osaka, both of Japan

[21] Appl. No.: 170,392

[22] Filed: Jul. 21, 1980

[30] Foreign Application Priority Data

Jul. 20, 1979 [JP] Japan ................................ 54/92313

[51] Int. Cl.³ ............................................ C03B 19/06
[52] U.S. Cl. ...................................... 65/18.2; 65/3.12; 65/13; 65/32
[58] Field of Search ..................... 65/3 A, 13, 32, 3.12, 65/18.2; 427/163; 350/96.31

[56] References Cited

U.S. PATENT DOCUMENTS

| | | | |
|---|---|---|---|
| 3,806,570 | 4/1974 | Flamenbaum et al. | 65/3 A X |
| 3,868,170 | 2/1975 | DeLuca | 65/3 A X |
| 4,203,744 | 5/1980 | Schultz et al. | 65/3 A |

*Primary Examiner*—Richard V. Fisher
*Attorney, Agent, or Firm*—Sughrue, Mion, Zinn, Macpeak and Seas

[57] ABSTRACT

A process for producing an optical fiber preform which comprises forming a particulate glass rod in which the dopant concentration gradually increases toward the center of its cross section, and gradually heating the rod starting at a temperature below the minimum collapsing point of the fine glass particles in the center of the rod in such a manner that the softening of the rod proceeds from the center outward, to thereby produce a transparent glass rod.

10 Claims, 7 Drawing Figures

PROCESS FOR PRODUCING OPTICAL FIBER PREFORM

BACKGROUND OF THE INVENTION

1. Field of the Invention

This invention relates to a process for producing transparent glass preforms from glass particles for graded-index optical fibers. More particularly, the invention relates to a process for producing such preforms which are uniform in composition and low in transmission loss.

2. Description of the Prior Art

Because of their many advantages, such as high resistance to external interference, light weight, and broad-band transmission properties, optical fibers are being used to replace the conventional copper wire that has been commercially used in the past as a medium for information transfer in the field of communications, and as means for pictorial transmission.

Two types of communication optical fibers are known: one is the clad or step-index fiber comprising a core of high refractive index and an outer cladding of low refractive index, and the other is the self-focusing or graded-index fiber which is so constructed that the index of refraction gradually lowers from the center outward. Several methods are known to produce the graded-index fiber. According to the method described in Japanese Patent Application (OPI) No. 101416/75 (the term "OPI" as used herein refers to a "published unexamined Japanese patent application"), a mixture of glass-forming materials and dopant are blown into a flame such as a $H_2$—$O_2$ flame or a $C_mH_n$—$O_2$ flame to form fine particles (also referred to as "soot") of glass which are deposited on a starting member to form a cylindrical particulate glass rod (porous glass) having a predetermined dopant distribution. The cylindrical particulate glass rod is then heated at a high temperature to form a transparent glass preform suitable for subsequent optical fiber-forming operations.

The conventional optical fiber preform produced by such a process often contains tiny air bubbles, which are a primary cause of reduction of the transparency of the final optical fiber and increases in the otherwise small transmission loss. A transparent preform free from air bubbles can be produced by gradually inserting the particulate glass rod into a tubular heating furnace. However, the amount of heat received by the glass rod within the furnace varies gradually along its longitudinal axis, resulting in a dopant diffusion that also varies in the longitudinal direction, and providing a preform wherein the refractive index of the periphery at one end differs from the refractive index of the periphery at the other end.

SUMMARY OF THE INVENTION

Therefore, a primary object of this invention is to provide a process for producing a graded-index optical fiber preform that is essentially free from air bubbles and which has a uniform composition along its longitudinal axis.

Noting the fact that the primary cause of the formation of air bubbles in a transparent glass preform is related to the method of heating the particulate glass rod, it has been found that, in the conventional heating method, the periphery of the rod softens before the center of the rod, so that air between glass particles located in the center and reactive gases are confined within the rod. Thus, by softening the center first, air between glass particles in the center of of the rod can be expelled out of the rod. On the other hand, the dopant has the effect of reducing the softening point of glass and, therefore, by forming a particulate glass rod wherein the dopant concentration increases toward the center, it becomes possible to cause the softening of the particulate glass rod to proceed from the center of the rod to the periphery thereof.

This invention achieves the above described object by forming a particulate glass rod containing dopant, wherein the dopant concentration increases toward the center and gradually heating the rod starting at a temperature lower than the minimum collapsing point of the glass particles that are located in the center, thereby causing the softening of the rod to proceed from the center of the rod to the periphery thereof. The term "minimum collapsing point" as used herein refers to the temperature at which the particulate glass rod being heated begins to shrink (illustrated by the graphs of FIG. 1). The minimum collapsing point is equivalent to a viscosity of glass of about $10^{13}$ poises.

DETAILED DESCRIPTION OF THE INVENTION

According to this invention, a particulate glass rod is formed in which the concentration of a dopant that increases the refractive index of glass and decreases its minimum collapsing point decreases from the center outward. Therefore, by gradually heating the rod starting at a temperature lower than the minimum collapsing point of the glass particles located in the center, softening starts at the center of the particulate glass having a low minimum collapsing point and proceeds gradually to the periphery. In consequence, essentially all air between the central glass particles and any reactive gases that are formed during heating are expelled from the rod, providing a transparent preform free from air bubbles. In addition, in the method of this invention, since all parts of the particulate rod are heated uniformly in a single step rather than passing it through a tubular heating furnace, such heating provides a transparent optical fiber preform consistent in composition along its longitudinal axis.

The dopants which can be used in the present invention are $GeO_2$, $P_2O_5$, $B_2O_3$ and the like, preferably $GeO_2$. These dopants can be incorporated into glass by well-known procedure from a halide such as $GeCl_4$, $POCl_3$, $BF_3$ or $BCl_3$, a hydride such as $GeH_4$, $PF_3$ or $B_2H_6$ or an organic compound such as $Ge(OC_2H_5)$, $P(OCH_3)_5$ or $B(OCH_3)$.

Figure 3:
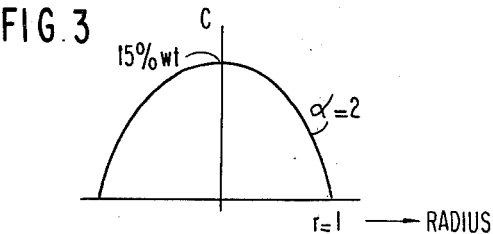
FIG. 3 illustrates an example of dopant distribution according to the present invention.

The dopant distribution in the particulate glass rod can be represented by the formula (1)

$$C = C_0(1 - r^\alpha) \quad (1)$$

wherein C represents a concentration of the dopant, Co represents a concentration of the dopant at the center of the rod, $\alpha$ is an index parameter and r represents a radius of the rod (r=1 is maximum). In a typical example using $GeO_2$ as a dopant (Co=15 wt% and $\alpha$=2), the dopant distribution can be represented by the formula (2)

$$C = 15(1 - r^2) \quad (2)$$

as illustrated in FIG. 3.

Figure 1:
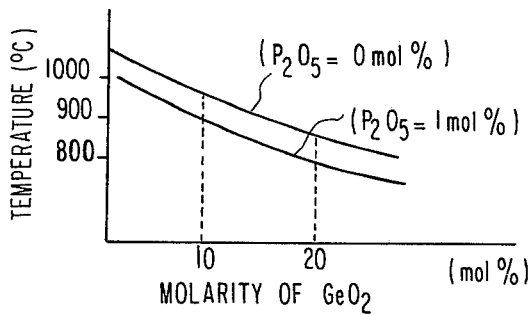
FIG. 1 illustrates the effect of dopant concentration on the minimum collapsing point of silicon dioxide.
Figure 2:
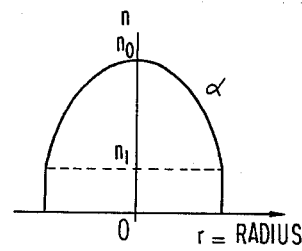
FIG. 2 illustrates the refractive index distribution of a cross section of a preform according to the invention.

Also, the amount of dopant in the optical fiber is generally determined by measurement of the refractive index of the optical fibers and the dopant distribution can be represented in terms of refractive index distributions as illustrated in FIG. 2 and by the following formula (3)

$$n = n_0 + (n_1 - n_0)r^\alpha \quad (3)$$

wherein n is a refractive index represented by $$\frac{\text{refractive index of core layer} - \text{refractive index of clad layer}}{\text{refractive index of clad layer}} \times 100$$

$n_0$ and $n_1$ each represents a refractive index at the center and in the outermost portion of the core layer, respectively, when the refractive index of the clad layer is expressed as 0, $\alpha$ is an index parameter and r is a radius of rod (r=1 is maximum). A preferred refractive index distribution in the present invention is $0 \leq n_1 \leq \frac{2}{3}n_0$ and $0.5 \leq \alpha \leq 5$ in the formula (3). A typical example is a refractive index distribution according to the formula (3) wherein $n_1$ is 0 and $\alpha$ is 2.

In the process of this invention, the particulate glass rod is prepared by oxidizing gaseous materials in a flame, for example, $H_2$—$O_2$ flame, $C_mH_n$—$O_2$ flame, plasma flame and the like. The particulate glass rod can be a cylindrical shape having, for example, about 5 to 6 cm in diameter and about 30 cm in length, a bulk density of about 0.2 to 1.0 g/cm³, a particle size of about 1 to 0.01 μm in diameter which may be partially sintered to form necks.

Figure 7:
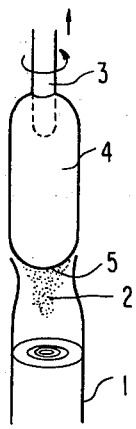
FIG. 7 illustrates a schematical view of one embodiment of the production of a particulate glass rod.

A typical example for the production of a particulate glass rod is a VAD (vapor-phase axial deposition) method as disclosed in U.S. Pat. No. 4,062,665 and illustrated in FIG. 7 in which 1 is a burner, 2 is soot (fine particles of glass), 3 is a starting member, 4 is a particulate glass rod and 5 is a depositing end. The gaseous materials, for example, $SiCl_4$ and $GeCl_4$ with argon carrier gas, $H_2$, argon and $O_2$ are supplied through the burner and oxidized in a flame while rotating and pulling upwardly the starting member to form the particulate glass rod. The rod thus obtained is then heated in a furnace which is capable of uniformly heating the periphery of the rod, for example, a tubular furnace, starting at a temperature below the maximum collapsing point of the fine glass particles in the center of the rod in such a manner that the softening of the rod proceeds from the center outward to thereby produce a transparent glass rod. The final sintering temperature can be about 1300° C. to about 1600° C. and heating rate can be about 100° C. to about 500° C. per hour.

The heating can be conducted at atmospheric pressure or reduced pressure suitable for removing air bubbles from the optical fiber preform, but under such conditions the resulting preform may be contaminated with the foreign materials introduced from the outside of the furnace. Accordingly, the heating of the particulate glass rod can be preferably conducted in an atmosphere containing helium having a pressure slightly higher than atmospheric pressure. Generally, the ratio of a partial helium pressure (PHe) to the total pressure (Po) can be $0.1 \leq PHe/Po \leq 1.0$.

The production of an optical fiber preform according to this invention is now described in greater detail by reference to the following examples, which are provided here for illustrative purposes only, and are not intended to limit the scope of the invention.

EXAMPLE 1

Silicon tetrachloride (glass-forming material), germanium tetrachloride (dopant), and phosphorus oxychloride (dopant) were supplied through the innermost pipe of a burner comprising four coaxial pipes at rates of 0.1 liter, 0.02 liters, and 0.004 liters per minute, respectively, while hydrogen gas was supplied at a rate of 3 liters per minute through the pipe adjacent to the innermost pipe (the second pipe), argon gas was supplied at a rate of one liter per minute through the next adjacent pipe (the third pipe), and oxygen was supplied at a rate of 5 liter per minute through the outermost (fourth) pipe. Glass soot produced by flame oxidation and the dopants were deposited on the tip of a silica glass rod (rotating at 10 rpm) by the VAD process to make a particulate glass rod measuring 5 cm in diameter and 30 cm long and in which the dopant concentration gradually decreased from the center outward.

Figure 4:
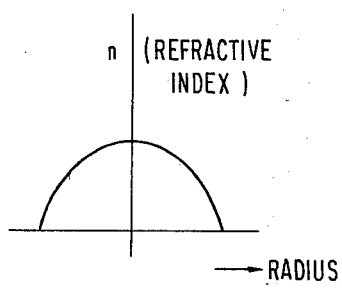
FIG. 4 illustrates the refractive index distribution of a cross section of the preform obtained in Example 1 of this invention.

The particulate glass rod was positioned in the center of a tubular heating furnace that was capable of uniformly heating the periphery of the rod. Starting at 800° C., which was about 100° C. lower than the minimum collapsing point of the fine glass particles located in the center of the rod, the temperature of the rod was elevated to 1450° C. at rate of 300° C. per hour while passing helium gas. A transparent optical fiber preform (having an outside diameter of 2 cm, and a length of 15 cm) free from air bubbles was obtained. Measurement with an X-ray microanalyzer showed that the preform had the same distribution of germanium and phosphorus at both ends and in the middle. This demonstrates the uniformity of the composition of the preform. FIG. 4 shows the refractive index distribution of a cross section of the preform.

REFERENCE EXAMPLE 1

The procedure of Example 1 was repeated to make a particulate glass rod. When the rod was held at 1400° C. for 2 hours in a furnace, a preform having a number of air bubbles in the core was produced.

REFERENCE EXAMPLE 2

Figure 5:
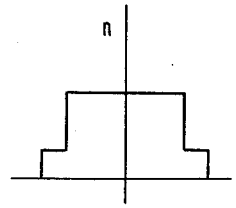
FIGS. 5 and 6 illustrate refractive index distributions for comparative optical fiber preforms.
Figure 6:
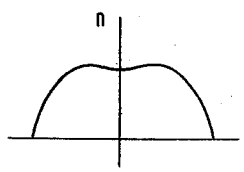

Particulate glass rods having refractive index distribution curves as shown in FIGS. 5 and 6 were compacted by heating in the same temperature range and at the same rate of elevation as used in Example 1. The resulting preforms were not free from air bubbles.

While the invention has been described in detail and with reference to specific embodiments thereof, it will be apparent to one skilled in the art that various changes and modifications can be made therein without departing from the spirit and scope thereof.

What is claimed is:

1. A process for producing an optical fiber preform, which comprises forming a particulate glass rod containing a dopant in which the dopant concentration gradually increases toward the center of its radial cross section, and uniformly, gradually heating all parts of the rod starting at a temperature below the minimum collapsing point of the fine glass particles in the center of the rod, and gradually increasing the temperature thereafter, so that the softening of the rod proceeds outwardly from the center producing a transparent glass rod preform.

2. A process according to claim 1 wherein the particulate glass rod is prepared by oxidizing gaseous materials in a flame and depositing the resulting particulate glass in the form of a rod.

3. A process according to claim 1 wherein the particulate glass rod preform comprises a major portion of silicon dioxide and a minor amount of a dopant which lowers the minimum collapsing point of the particulate glass rod.

4. A process according to claim 1 wherein the particulate glass rod is heated in an atmosphere having a pressure slightly higher than atmospheric pressure.

5. A process according to claim 1 or 4 wherein the particulate glass rod is heated in an atmosphere containing helium.

6. A process according to claim 3 wherein the dopant is $GeO_2$.

7. A process according to claim 3 wherein the dopant is $P_2O_5$.

8. A process according to claim 3 wherein the dopant is $B_2O_3$.

9. A process according to claim 1 wherein the heating is continued until a temperature of about 1300° C.–1600° C. is reached.

10. A process according to claim 1 or 9 wherein the temperature is gradually increased at a rate of about 100° C. per hour–500° C. per hour.

* * * * *